(12) United States Patent
Muhammad et al.

(10) Patent No.: US 9,942,118 B1
(45) Date of Patent: Apr. 10, 2018

(54) SENTINEL NETWORK DEVICES AND SENTINEL MARKER

(71) Applicant: AMAZON TECHNOLOGIES, INC., Seattle, WA (US)

(72) Inventors: Moosa Muhammad, Seattle, WA (US); Joseph E. Magerramov, Bellevue, WA (US); William Hunter Hudson, Beaux Arts Village, WA (US)

(73) Assignee: Amazon Technologies, Inc., Seattle, WA (US)

( * ) Notice: Subject to any disclaimer, the term of this patent is extended or adjusted under 35 U.S.C. 154(b) by 387 days.

(21) Appl. No.: 14/868,007

(22) Filed: Sep. 28, 2015

(51) Int. Cl.
G06F 15/16 (2006.01)
H04L 12/26 (2006.01)
H04L 12/24 (2006.01)

(52) U.S. Cl.
CPC ...... H04L 43/0852 (2013.01); H04L 41/0681 (2013.01)

(58) Field of Classification Search
CPC .............. H04L 43/0852; H04L 41/0681
USPC ................... 709/221, 200, 224, 248
See application file for complete search history.

(56) References Cited

U.S. PATENT DOCUMENTS

| | | | | |
|---|---|---|---|---|
| 2005/0289243 A1* | 12/2005 | McInerney | ....... | G06F 17/30067 709/248 |
| 2011/0172938 A1* | 7/2011 | Gu | ......... | G01D 4/002 702/62 |
| 2015/0179071 A1* | 6/2015 | Canac | .......... | G08G 1/163 701/301 |
| 2015/0188662 A1* | 7/2015 | Shapira | ......... | H04K 3/825 455/1 |
| 2017/0063815 A1* | 3/2017 | Smith | ......... | H04L 63/061 |

* cited by examiner

Primary Examiner — El Hadji Sall
(74) Attorney, Agent, or Firm — Blank Rome LLP

(57) ABSTRACT

A computing system includes one or more processors and memory that includes instructions, that when executed by the one or more processors, cause the processors to receive, by a sentinel device of a data interface of a distributed computing environment, command instructions that instruct a plurality of networking devices to change state to implement network configuration requests from a synchronization node of a distribution interface of the distributed computing environment utilizing a communication protocol. The data interface includes a networking group that includes the sentinel device and the edge devices. The instructions also cause the processors to identify, by the sentinel device, distribution latency patterns of the command instructions based on distribution delay of the command instructions and generate, by the sentinel device, an alarm based on a determination that the distribution delay of one of the command instructions exceeds a threshold value.

21 Claims, 12 Drawing Sheets

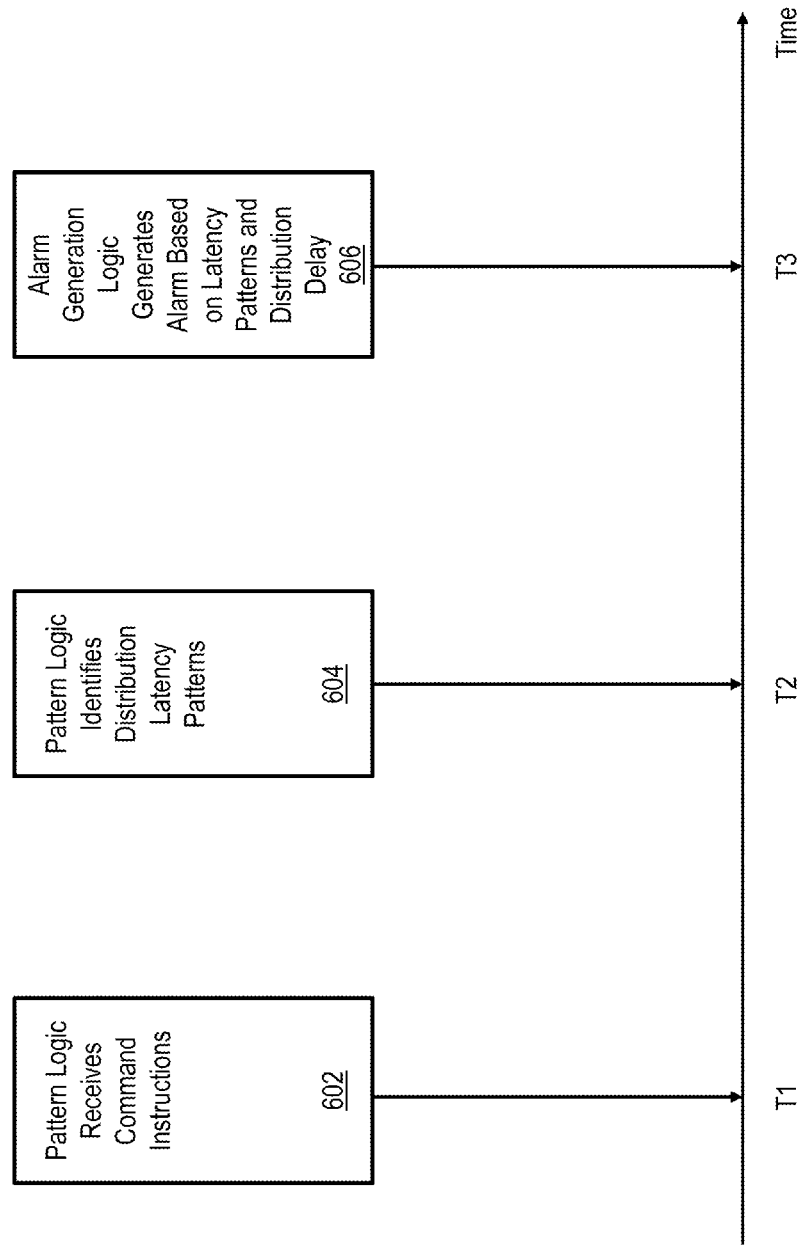

SENTINEL NETWORK DEVICES AND SENTINEL MARKER

BACKGROUND

Many companies and organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers have increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. In many cases, the functionality and usability of applications that run on such platforms may rely extensively on network communications with other parts of the provider network, and/or with external entities such as clients or third parties.

In many of these distributed computing networks, clients have the ability to customize the mapping of their specific network resources. For example, a client may be able to set specific subroutes, subnets, elastic Internet Protocol (IP) addresses, private IP addresses, etc. Thus, the distributed network receives the configuration data from the client. This configuration data then may be transmitted (pushed or pulled) to networking devices which implement the client's requested network configuration.

BRIEF DESCRIPTION OF THE DRAWINGS

For a detailed description of various examples, reference will now be made to the accompanying drawings in which:

FIG. 6 shows an example responsiveness metric that may be utilized to generate an alarm utilizing a sentinel device in a distributed computing environment, in accordance with various embodiments;

DETAILED DESCRIPTION

Figure 1:
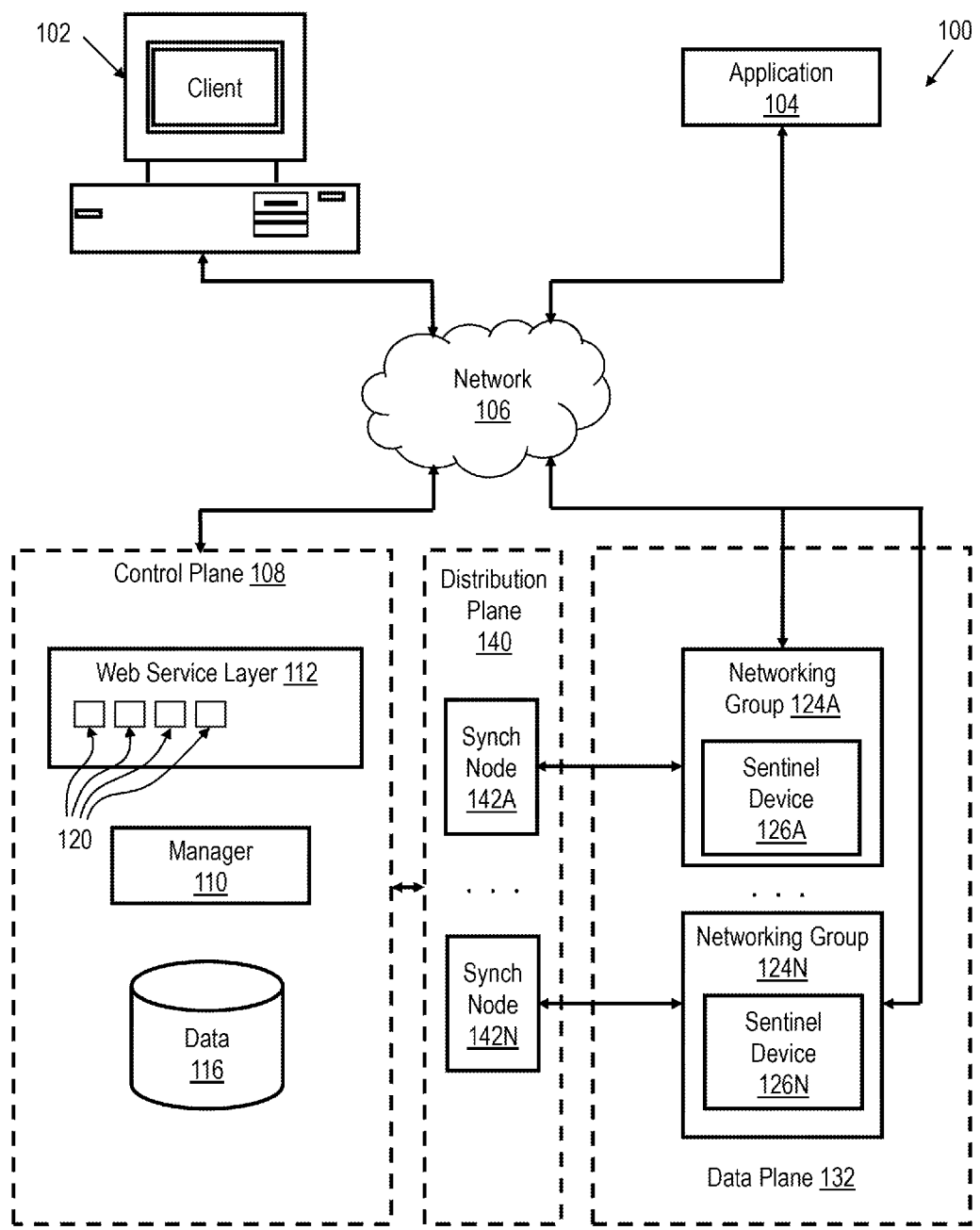
FIG. 1 shows a block diagram of an environment for providing access to various resources in a distributed computing environment, in accordance with various embodiments.

In large-scale distributed systems, clients may have the ability to customize the mapping of their specific network resources, which can be implemented in provider network as virtual networks that run over an underlying physical network. For example, a client may be able to set specific subroutes, subnets, elastic Internet Protocol (IP) addresses, private IP addresses, etc. for virtual networks. Thus, the distributed network receives such configuration data from the client. This configuration data then may be translated into configuration data to configure the underlying physical network and transmitted (pushed or pulled) to networking devices which implement the client's requested configuration. Networking devices may include routers, switches, network address translation muter (NAT), integrated access devices, or any other networking infrastructure utilized for communications within the network and from and to the network. In some examples, a networking device may take the form of an edge device (i.e., a device that provides an entry point into the provider network). For example, configuration data may be transmitted to a networking device, which may cause the muting table within the networking device to be overridden with new state information corresponding to the requested network configuration. This causes the networking device to route packets to different parts of the physical network and/or onto the Internet in accordance with the client's requested configuration. However, corrupted configuration data or latency delayed configuration data may cause network degradation. Therefore, it is desirable that the networking devices timely receive configuration data in order to implement a client's customized mapping of their specific resources.

Various embodiments of methods and apparatus for monitoring and generating alarms for unacceptable latency delay of network configuration requests in a large-scale distributed system utilizing sentinel devices are described. In some embodiments, a sentinel device comprises pattern logic and alarm generation logic that act to generate alarms if specific quality of service metrics are not met in the distribution of the configuration requests. For example, if a client requests a change to its virtual network or virtual machines, the network's configuration that affects a plurality of networking devices, a change in state command corresponding to the physical network to implement the network configuration associated with a client request is transmitted from a synchronization node to the networking devices and a sentinel device. The sentinel device may be associated with the networking devices as part of a networking group. Because the protocol utilized to transmit the change in state command to each of the networking devices and the sentinel device is the same, the sentinel device appears the same to the synchronization node as do the remainder of the networking devices in the networking group. While the networking devices may implement the network configuration, the sentinel device may not. Instead, because the sentinel device is not resource constrained, unlike many of the networking devices, the sentinel device identifies latency delay patterns to aid in the determination of whether the quality of service metrics are being met.

In some embodiments, the latency delay patterns may be based on the historical distribution delay in transmitting and receiving the change in state command. The sentinel device may utilize the latency delay patterns to generate a threshold value of delay that meets the quality of service metrics. The sentinel device determines whether the distribution latency delay meets the quality of service metrics by comparing the distribution delay to a threshold value. If the threshold value is exceeded, the quality of service metrics are not met, and the sentinel device generates an alarm which is transmitted to the synchronization node that transmitted the state of change command to the networking group. The synchronization node then may cease transmitting further data to the networking group, and a second synchronization node may begin transmitting additional data to the networking group.

In much of the following description, a provider network is used as an example of a distributed system in which the centralized networking configuration techniques may be implemented. Virtual networks set up by an entity such as a company or a public sector organization to provide one or more network-accessible services (such as various types of cloud-based database, computing or storage services) accessible via the Internet and/or other networks to a distributed set of clients may be termed "provider networks" herein. At least some of the services may be packaged for client use in service units called "instances": for example, a virtual machine instantiated by a virtualized computing service may represent a "compute instance," and a storage device such as a block-level volume instantiated by a storage service may be referred to as a "storage instance." In some embodiments, instances of higher-level services may be packaged using compute instances and/or storage instances—e.g., a database instance may be built using a combination of compute and storage instances in some embodiments. Computing devices such as servers and/or storage devices at which such units of various network-accessible services of a provider network are implemented may be referred to herein as "instance hosts" or more simply as "hosts." In the remainder of this document, the term "client," when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of the provider network.

A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments. Clients may interact with resources and services at the provider network from devices located at client-owned or client-managed premises or data centers external to the provider network, and/or from devices within the provider network. In at least some embodiments, a virtualized computing service offering various types of compute instances may be implemented within the provider network, and such compute instances may be allocated to clients. Other services of the provider network may be accessed from such compute instances as well as from external locations. It is noted that although provider networks serve as one example context in which many of the validation techniques described herein may be implemented, those techniques may also be applied to other types of distributed systems than provider networks, e.g., to large-scale distributed application environments in which different components of the applications may have time-varying bandwidth needs.

FIG. 1 shows a block diagram of an environment 100 for providing access to various resources in a distributed computing environment, in accordance with various embodiments. Systems and methods in accordance with one embodiment provide at least one resource access gateway, or control plane, either as part of the data environment or in a path between the user and the data plane via a distribution plane, that enables users and applications to access shared and/or dedicated resources, while allowing customers, administrators, or other authorized users to allocate resources to various users, clients, or applications and ensure adherence to those allocations. Such functionality enables a user to perform tasks such as storing, processing, and querying relational data sets in a provider network without worry about latency degradation or other such issues due to other users sharing the resource. Such functionality also enables guest users to obtain access to resources to perform any appropriate functionality, such as to render and/or serve streaming media or perform any of a number of other such operations. While this example is discussed with respect to the Internet, Web services, and Internet-based technology, it should be understood that aspects of the various embodiments can be used with any appropriate resources or services available or offered over a network in an electronic environment. Further, while various examples are presented with respect to shared access to disk, data storage, hosts, and peripheral devices, it should be understood that any appropriate resource can be used within the scope of the various embodiments for any appropriate purpose, and any appropriate parameter can be monitored and used to adjust access or usage of such a resource by any or all of the respective users.

A resource gateway or control plane 108 can be used in some environments to provide and/or manage access to various resources in the data plane 132. In a distributed computing environment, this can correspond to a manager 110 or similar system that manages access to the various resources in the provider network. In one embodiment, a set of application programming interfaces (APIs) 120 or other such interfaces are provided that allow a user or customer to make requests for access to various resources. Additionally, the APIs 120 allow a user, through client 102, to make network configuration requests. For example, a user may request specific network mapping, subroutes, subnets, elastic IP addresses, private IP addresses, etc. Once access is established, a resource is allocated, etc., a user can communicate directly with the resource to perform certain tasks relating to that resource, such as data storage or processing. The user can use direct interfaces or APIs to communicate with data instances, hosts, or other resources once access is established, but uses the control plane component(s) to obtain the access.

In this example, a computing device 102 for an end user is shown to be able to make calls through a network 106 to a control plane 108 (or other such access layer) to perform a task such as to obtain access to a specified resource or resource type and/or to request a specific network configuration. While an end user computing device and application are used for purposes of explanation, it should be understood that any appropriate user, application, service, device, component, or resource can access the interface(s) and components of the connection component and data environment as appropriate in the various embodiments. Further, while certain components are grouped into a data, control, and distribution "plane," it should be understood that this can refer to an actual or virtual separation of at least some resources (e.g., hardware and/or software) used to provide the respective functionality. Further, the control plane 108 can be considered to be part of the data plane 132 and/or distribution plane 140 in certain embodiments. While a single control plane is shown in this embodiment, there can be multiple instances of control or access management components or services in other embodiments. A control plane can include any appropriate combination of hardware and/or software, such as at least one server configured with computer-executable instructions. The control plane also can include a set of APIs 120 (or other such interfaces) for receiving Web services calls or other such requests from across the network 106, which a Web services layer 112 can parse or otherwise analyze to determine the steps or actions needed to act on or process the call. For example, a Web service call might be received that includes a request for a specific network mapping as part of a network configuration option. In this example, the Web services layer can parse the request to determine the type of connection or access needed, the appropriate type(s) of resource needed, or other such aspects.

The control plane can include one or more resource allocation managers 110, each responsible for tasks such as validating the user or client associated with the request and obtaining or allocating access to the appropriate resource(s). Such a system can handle various types of requests and establish various types of connections. Such a system also can handle requests for various types of resources, such as specific graphic processors or other types of hardware or hardware functionality, and can provide access to the appropriate resource(s). Components of the data plane 132, or the resource layer of the service provider environment, may perform the necessary tasks to allocate virtual machine instances residing on the data plane 132 in response to customer requests. For allocation of an instance, for example, the manager 110 can be configured to provision an instance (e.g., a virtual machine) by selecting a host to run the instance, sending a command to a server manager (e.g., virtualization system such as a hypervisor), to launch the instance, and any other set-up operations, such as allocating a volume of off-instance persistent storage, attaching the persistent storage volume to the instance, and allocating and attaching a public IP address, network interface, or other address, port, interface, or identifier for the instance. For tasks such as obtaining processing of an instruction using a particular type of hardware, for example, the components of the data plane 132, in conjunction with the control plane 108, can perform actions such as provisioning a device for a user and providing shared and/or dedicated access to the resource for a period of time at a particular level of access to the resource. Whenever a user requests implementation of a network configuration, data store 116 stores specific state information for each of the devices needed to implement the requested network configuration. It should be understood that the data store 116 can be a separate data store or a portion of another data store.

In various embodiments, as discussed, the data plane 132 takes the form of (or at least includes or is part of) a service provider environment, or a set of Web services and resources that provides data storage and access across a network of hardware and/or software components. An IP address derived from DNS mappings is beneficial in such a service provider environment, as instance or availability failures, for example, can be masked by programmatically remapping the IP address to any appropriate replacement instance for a use. A request received from a user 102 or application 104 to remap the provider network that may take the form of a network configuration request, for example, can be directed to and distributed to any of networking groups 124A-N or to multiple networking groups to actuate the remapping. Each of the networking groups 124 contain a sentinel device 126 and various other networking devices, such as routers, switches, network address translation routers (NAT), integrated access devices, or any other networking infrastructure utilized for communications within the network and from and to the network. In some examples, a networking device may take the form of an edge device (i.e., a device that provides an entry point into the provider network). An "edge device" as used herein can refer to any device in hardware and/or software capable of receiving a packet of information from outside the provider network, and/or capable of transmitting a packet of information from inside the provider network. For example, any device that is capable of receiving and/or transmitting a packet of information from data plane 132 to client 102 is an edge device.

Each of the devices within the networking group 124 receives the network configuration request. The networking devices within the networking group 124 may then implement the network configuration request (e.g., implement the remapped IP addresses and route packets in accordance with the remapped configuration) while the sentinel device 126 may not implement any network configuration request (e.g., does not route packets in accordance with the remapped configuration) because the sentinel device 126 may be configured such that it does not route packets at all. In other words, the sentinel device 126 does not route customer traffic. Such an approach allows for instances to be dynamically moved, updated, replicated, etc., without requiring the user or application to change the IP address or other address used to access the instance because the service provider environment is operable to updating routing tables in networking devices in the provider network to reflect the change in the IP address.

For example, a client may request a specific network configuration. The control plane 108 then may store state information for the networking devices in networking group 124, (e.g., an edge device) that corresponds to the network configuration associated with the client request in data store 116. In other words, in order to implement the network configuration associated with the client request, the networking devices must be placed into a certain state. The state that the networking devices must be placed in order to implement the network configuration associated with the client request is stored in data store 116. The control plane 108 then may generate a command instruction that instructs the networking device to configure itself to the state corresponding to the network configuration associated with the client request that is stored in data store 116. For example, the network configuration associated with the client request may require that a networking device alter its state (i.e., the stored information within the networking device at a given instant in time). A command instruction then may be generated by the control plane 108. The command instruction may contain the information or state that the networking devices need to implement the network configuration request. Thus, in an example, the command instruction may contain an instruction for the networking devices to route specific packets utilizing a certain mapping. Thus, in this example, the command instruction may contain a request to change an elastic IP address or a private IP address in an edge device. The command instruction is transmitted from control plane 108 to each of the devices in networking groups 124. The networking devices of the networking groups 124 may implement the network configuration from the command instruction while the sentinel devices 126 do not.

In alternative embodiments, the networking devices (e.g., an edge device) may receive from control plane 108 and host the client input data. For example, instead of, or in conjunction with receipt of a command instruction from the control plane 108, the networking devices may receive the network configuration option associated with the client request or state information required to implement the network configuration associated with the client request. In this example, after being stored in data store 116, the state information is directly transmitted from the control plane 108 to the networking group 124, in some embodiments utilizing synchronization nodes 142.

Once the network configuration requested has been received, originally from client 102, and implemented by the networking devices of the networking groups 124, each of of the sentinel devices 126 may, in some embodiments, provide feedback to the client 102 that the network configuration has been implemented. For example, all of the devices in networking group 124A may receive a command instruction from control plane 108 instructing those devices to implement a network configuration requested by client 102. Once the sentinel device 126A determines that networking devices of the networking group 124A have implemented the network configuration, sentinel device 126A may transmit a signal back, through the distribution plane 140, control plane 108, and network 106 to the client 102 indicating that the network configuration has been implemented by the networking devices. In alternative embodiments, the sentinel devices 126 may instead store an indication that the network configuration has been implemented by the networking devices of their respective networking groups 124, and transmit the indication to the client 102 in response to a query from client 102. In these ways, the sentinel devices 126 may provide feedback to the client 102 indicating that the client 102's requested network configuration has been implemented.

The sentinel devices 126 may also store a holistic view of past network configurations for the networking devices of the networking groups 124. For example, sentinel device 126A may store historical state information and/or other network configuration information for each of the networking devices of networking group 124A. An example of historical networking configuration may be the state information and/or other network configuration information that each of the networking devices of networking group 124A implemented on a previous day or any other period of time. Furthermore, in response to a query from client 102, the sentinel devices 126 may transmit any of the historical network configuration information stored on the sentinel devices 126 back to the client 102. In alternative embodiments, the historical network configuration information may be transmitted by sentinel devices 126 to client 102 on a regular basis (e.g., once per day) or in response to a triggering event (e.g., receiving a command instruction from the control plane 108).

The environment 100 may also include a distribution plane 140 which supports communications from control plane 108 to the data plane 132. While shown separately, distribution plane 140 may be integrated into control plane 108 and/or data plane 132. In this configuration, distribution plane 140 may enable communications of state information needed to implement a client's network configuration option that is stored in data store 116 from control plane 108 to the networking devices in networking group 124 in data plane 132. Distribution plane 140 may include synchronization nodes 142A-N.

Synchronization nodes 142 are nodes that are configured to distribute the command instructions received from the control plane 108, or in some embodiments, the client input data, to the networking groups 124 in the data plane 132. In some embodiments, one synchronization node is allocated to each networking group 124A-N. For example, a single synchronization node 142A may be allocated to transmit command instructions to each device in networking group 124A while synchronization node 142N is allocated to transmit command instructions to each device in networking group 124N.

Each of the synchronization nodes 142A-N may contain push logic and pull logic to enable the distribution of the command instructions. Push logic may include hardware and/or software that causes control plane 108 to periodically transmit or "push" data stored in a data store to data plane 132. For example, the push logic may cause control plane 108 to push state information stored in data store 116 and corresponding to a client's networking configuration option to the networking groups 124 every 10 seconds. Alternatively, the push logic may cause control plane 108 to push data stored in a data store to data plane 132 in response to an event. For example, the push logic may cause control plane 108 to push state information stored in data store 116 and corresponding to a client's networking configuration option to the networking groups 124 every time that the stored state information changes. Thus, in some embodiments, if a user of client 102 enters network configuration data which, if implemented would alter the state of any of the networking devices stored in any of the networking groups 124, the state information stored in data store 116 will change. This may cause the push logic to push the updated state information to edge device 124.

The pull logic may be hardware and/or software that causes control plane 108 to transmit data stored in a data store to data plane 132 in response to a request from data plane 132. For example, one or more networking devices may request state information stored in data store 116. In response to the request, the pull logic will "pull" the state information from the data store 116 and provide that information to networking groups 124. In these ways, the networking groups 124 are capable of receiving data from the control plane 108.

Figure 2:
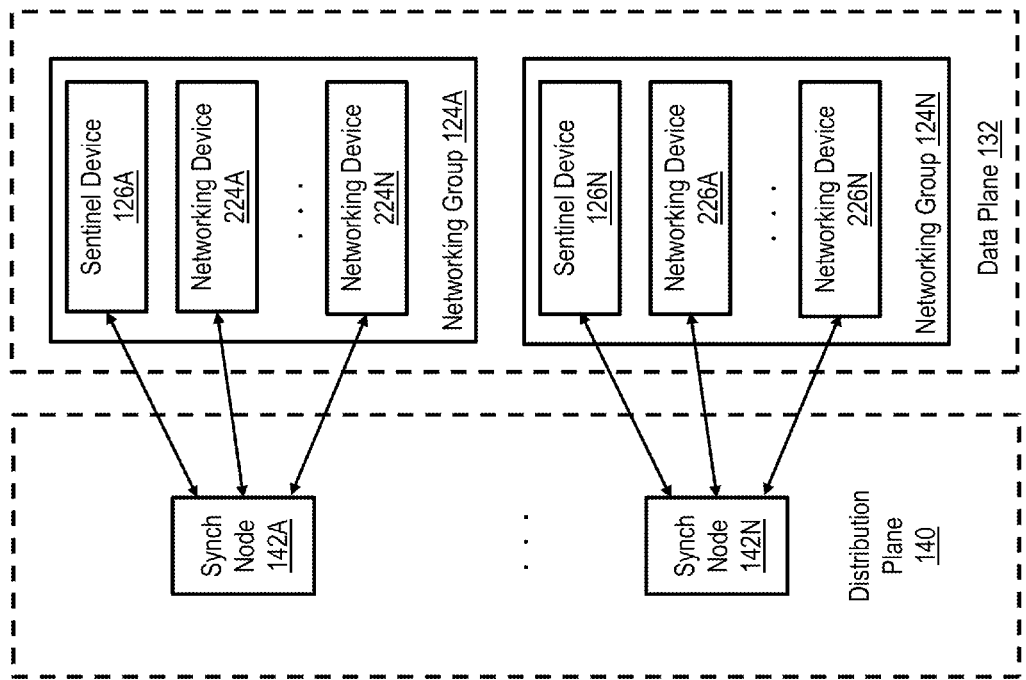
FIG. 2 shows an example of an interaction between a distribution plane and a networking group of a data plane in a distributed computing environment, in accordance with various embodiments.

FIG. 2 shows an example of an interaction between a distribution plane 140 and networking groups 124 of a data plane 132 in a distributed computing environment, in accordance with various embodiments. As discussed previously, each synchronization node 142 may be allocated to distribute the command instructions to a single networking group 124. Each networking group 124 contains a sentinel device and one or more networking devices. For example, networking group 124A contains sentinel device 126A and networking devices 224A-N while networking group 124N contains sentinel device 126N and networking devices 226A-N. Each of the networking groups may have any number of networking devices while having a single sentinel device. In some examples, each networking group 124 may have hundreds or more networking devices. Therefore, each synchronization node 142 may distribute the command instructions containing the networking configuration option to hundreds or more devices.

The synchronization nodes 142 distribute the command instructions, or other client input data, to the sentinel devices and networking devices utilizing a single communication protocol. For example, synchronization node 142A distributes data to sentinel device 126A utilizing the same communication protocol that synchronization node 142A utilizes in distributing data to networking devices 224A-N. Similarly, synchronization node 142N distributes data to sentinel device 126N utilizing the same communication protocol that synchronization node 142N utilizes in distributing data to networking devices 226A-N. Therefore, the sentinel devices 126 appear to the synchronization nodes 142 as if the sentinel devices 126 are networking devices. For example, sentinel device 126A appears the same to synchronization node 142A as each of networking devices 224A-N appears to synchronization node 142A. Thus, the synchronization nodes 142 distribute the same data to the networking devices, such as networking devices 224A-N, as is distributed to the sentinel devices, such as sentinel device 126, that is in the same networking group even though the sentinel node may have different hardware and software than the networking devices. Thus, the sentinel devices and the networking devices within the same networking group receive the same data from the synchronization node.

In some embodiments, both the networking devices 224 and 226 and the synchronization nodes 142 may receive data, such as the command instructions, from and transmit data to the synchronization nodes 142. Therefore, the networking devices 224 and 226 and the sentinel devices 126 may be configured to communicate with the synchronization nodes 142 bi-directionally. For example, networking device 224A and sentinel device 126A may be configured to receive data from, and transmit data to synchronization node 142A utilizing a single communication protocol. However, the communication channel between sentinel devices 126 and the synchronization node 142, in some embodiments, may allow for greater throughput of data for transmissions from the sentinel devices 142 to the synchronization nodes 142 than transmissions from the networking devices 224 and 226 to the synchronization nodes 142.

In some embodiments the provider network may be organized into a plurality of geographical regions, and each region may include one or more availability zones. An availability zone in turn may comprise one or more distinct locations or data centers, engineered in such a way that the resources in a given availability zone are insulated from failures in other availability zones. That is, a failure in one availability zone may not be expected to result in a failure in any other availability zone; thus, the availability profile of a resource instance is intended to be independent of the availability profile of a resource instance in a different availability zone. In some embodiments, each networking group 124 corresponds to an availability zone. For example, networking group 124A may correspond to a first availability zone while networking group 124N corresponds to a second availability zone. Thus, in this example, the networking devices 224A-N correspond to all the networking devices in the first availability zone while the networking devices 226A-N correspond to all the networking devices in the second availability zone. In alternative embodiments, the networking groups 124 may correspond to other configurations, such as the geographic regions, the distinct data centers, etc.

Figure 3:
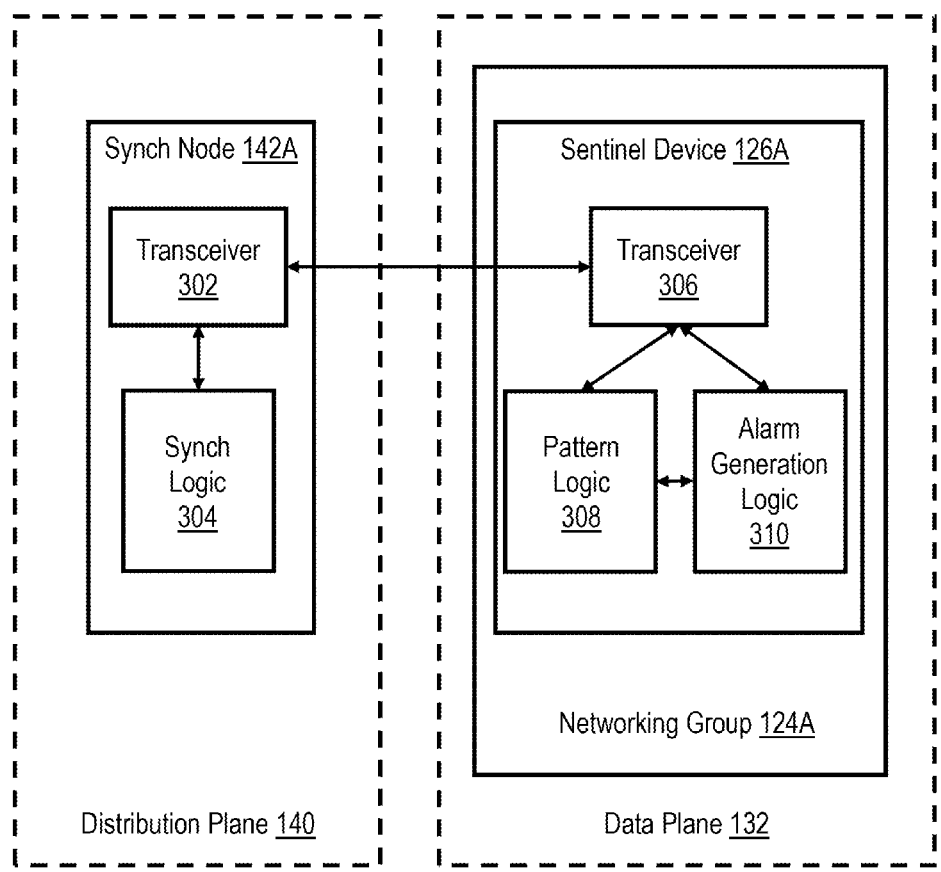
FIG. 3 shows an example of an interaction between a synchronization node of a distribution plane and a sentinel device of a networking group of a data plane in a distributed computing environment, in accordance with various embodiments.

FIG. 3 shows an example of an interaction between synchronization node 142A of distribution plane 140 and sentinel device 126A of networking group 124A of data plane 132 in a distributed computing environment, in accordance with various embodiments. Synchronization node 142A may include transceiver 302 and synchronization logic 304. Transceiver 302 is configured to transmit from synchronization node 142A to sentinel device 126A and all the other networking devices in networking group 124A and receive communications from the sentinel device 126A. Transceiver 302 may be any type of transceiver including a wired and/or wireless transceiver. More specifically, transceiver 302 may be a medium attachment unit (MAU), a gigabit interface converter (GBIC), a small form-factor pluggable (SFP), an enhanced small form-factor pluggable (SFP+), a ten gigabit small form factor pluggable (XFP), a ten attachment unit interface (XAUI), a c form-factor pluggable (CFP), and/or any other device that is capable of transmitting and receiving data communications.

Synchronization logic 304 is configured to perform certain processing functions for synchronization node 142A. For example, synchronization logic 304 is configured to determine which networking group 124 transceiver 302 is to distribute the command instructions (i.e., the configuration request data). The synchronization logic 304 registers each of the sentinel devices 126 and networking devices 224A-N in the networking group. Thus, while, in some embodiments, a single synchronization node 142 is allocated to each networking group 124 for the purpose of transmitting data, multiple synchronization nodes 142A-N may determine which of the synchronization nodes will transmit data to each networking group. The synchronization logic 304 may then, in combination with other synchronization nodes, distribute the sentinel devices and networking devices into their respective networking groups. Synchronization logic 304 then provides the push and pull logic to distribute the data to the networking group. In alternative embodiments, synchronization logic 304 assigns sentinel devices 126 to networking devices to make up a networking group 124A. Then the synchronization logic 304 provides the push pull logic to distribute the data to the networking group.

The sentinel device 126A may include transceiver 306, pattern logic 308, and alarm generation logic 310. Transceiver 306 is configured to transmit and receive communications from and to the synchronization node 142A. Like transceiver 302, transceiver 306 may be any type of transceiver including a wired and/or wireless transceiver. More specifically, transceiver 306 may be a medium attachment unit (MAU), a gigabit interface converter (GBIC), a small form-factor pluggable (SFP), an enhanced small form-factor pluggable (SFP+), a ten gigabit small form factor pluggable (XFP), a ten attachment unit interface (XAUI), a c form-factor pluggable (CFP), and/or any other device that is capable of transmitting and receiving data communications. Transceiver 306 may be configured to receive the command instruction or client input data from the synchronization node 142A.

Pattern logic 308 is configured to receive the command instructions or other data received by transceiver 306 and identify patterns based on quality of service (QOS) metrics. One such QOS metric is distribution latency (i.e., the time delay from transfer of the command instruction or data from the control plane 108 to the sentinel device 126A). Therefore, pattern logic 308 may identify distribution latency patterns for the received data. The pattern logic 308 may utilize historical distribution latency to identify patterns corresponding to the time that elapses for a transmission of the data from the control plane 108 to the sentinel device 126A to develop long running patterns of latency delay. For example, the pattern logic 308 may determine that at a certain time of day the median distribution latency for a command instruction to be received at sentinel device 126A from control plane 108 utilizing synchronization node 142A is 10 ms. The pattern logic 308 may also determine that at a second time of day the median distribution latency for a command instruction to be received at sentinel device 126A from control plane 108 utilizing synchronization node 142A is 5 ms. Another QOS metric that may be patterned by pattern logic 308 is the accuracy of the received data. For example, pattern logic 308 may identify patterns of when and to what extent the received data from synchronization node 142A is correct (i.e., what sentinel node 126A and the networking devices in networking group 124A expect to receive).

These patterns, which may be based on QOS metrics, may then be utilized to develop a threshold value of distribution delay acceptable to the provider network. For example, the pattern logic 308 may also generate a threshold value at which the distribution delay is unacceptable to the network (e.g., causes the network to fail to meet a service level agreement (SLA)). This threshold value may be based on the distribution latency patterns identified. In some embodiments, the threshold value is based on the average or median distribution delay in the distribution latency patterns, while in alternative embodiments, the threshold value is based on a percentage of the longest distribution delay in the distribution latency patterns (e.g., 90% of the longest distribution delay). For example, if the average or median distribution time of a command instruction from the control plane 108 to the sentinel device 126A utilizing synchronization node 142A is 10 ms, then the threshold value may be based on this 10 ms time. Therefore, in an example, the threshold value may be double this median time (i.e., 20 ms). In alternative examples, if the longest distribution delay in receiving the control message from the control plane 108 is 20 ms, then the threshold value may be 90% of the longest distribution delay (i.e., 18 ms). In still further embodiments, the threshold value is based on a SLA itself. For example, if an SLA requires a network provider to provide a certain amount of network throughput, the threshold value generated by the pattern logic 308 may be determined such that the distribution delay is at the threshold value whenever the amount of network throughput fails to meet the SLA requirement.

Alarm generation logic 310 may generate an alarm if the distribution delay in receiving the command instruction or other data from the control plane exceeds the threshold value generated by pattern logic 308. Alarm generation logic 310 receives the incoming data from synchronization node 142A, which may include the command instruction, and makes a determination in the time that elapsed from the transmission of the data from the control plane 108 to the receipt of the data by transceiver 306 in sentinel device 126A.

In an example, a sentinel marker may be included in the data that is received by the sentinel device 126A. The sentinel marker may comprise metadata that is embedded in the data or command instruction received by the synchronization node 142A. The metadata in the sentinel marker may include information that allows the sentinel device 126A to determine which synchronization node of the plurality of synchronization nodes 142A-N is distributing data to sentinel device 126A. The metadata may also include timing information that allows the alarm generation logic 310 to calculate the elapsed time, or distribution delay, in receiving the data from the control plane 108 through synchronization node 142A.

Once the alarm generation logic 310 determines the distribution delay in receiving the data from the control plane 108, the alarm generation logic 310 may compare the distribution delay to the threshold value generated by the pattern logic 308. If the distribution delay is less than the threshold value, then the alarm generation logic 310 does not generate an alarm and continues to monitor incoming data (e.g., command instructions). If, however, the distribution delay equals or exceeds the threshold value, an alarm is generated. In some embodiments, the alarm that is generated by alarm generation logic 310 is a communication that is transmitted by transceiver 306, in sentinel device 126A, to synchronization node 142A. In other words, the alarm may include a communication from the sentinel device 126A to the synchronization node 142A that transmitted the original data to the sentinel device. The alarm communicates to the synchronization node 142A that the distribution delay has equaled or exceeded the threshold value. In addition to transmitting the alarm to the synchronization node 142A, the alarm may be provided to network administrators or computing systems in the provider network that may analyze the alarm such that network improvements may be made. These alarm notifications may provide traffic patterns, the type of data that triggered the alarm, and where bottlenecks within the network have occurred.

Figure 4:
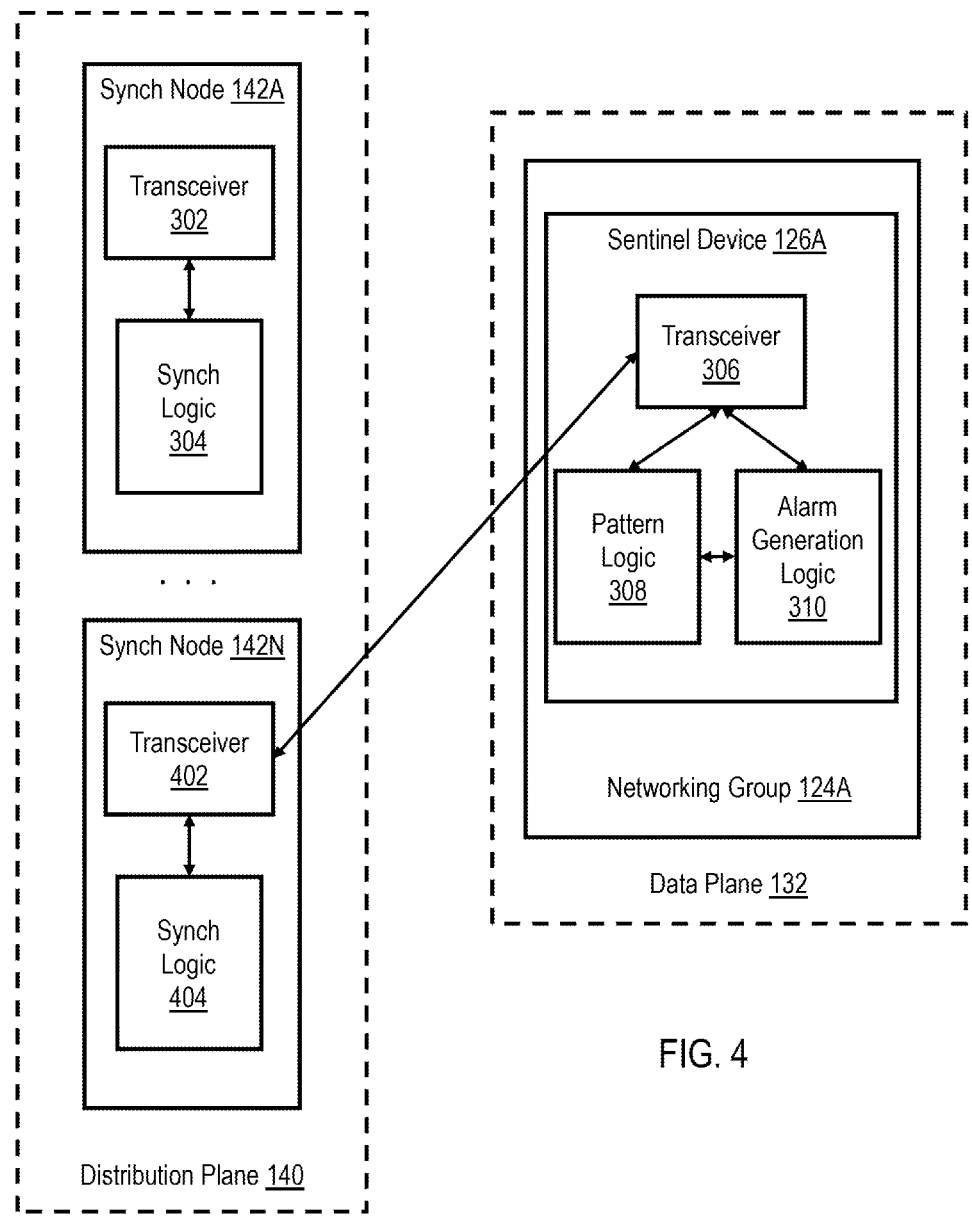
FIG. 4 shows an example of an interaction between two synchronization nodes of a distribution plane and a sentinel device of a networking group of a data plane in a distributed computing environment, in accordance with various embodiments.

FIG. 4 shows an example of an interaction between two synchronization nodes, synchronization nodes 142A and 142N of distribution plane 140, and sentinel device 126A of networking group 124A of data plane 132 in a distributed computing environment, in accordance with various embodiments. Continuing the example from FIG. 3, once the synchronization node 142A receives an alarm from sentinel device 126A indicating that the distribution delay has equaled or exceeded the threshold value, synchronization logic 304 may cause the synchronization node 142A to cease distribution of data (e.g., command instructions) to the networking group 124A. Thus, synchronization node 142A may cease distribution of data from control plane 108 to sentinel device 126A and networking devices 224A-N. Within the distribution plane 240, a second synchronization node, for example synchronization node 142N, is then selected to transmit data to each of the devices in networking group 124A. In other words, in response to synchronization node 142A ceasing the distribution of data to networking group 124A, synchronization node 142N begins distributing data to networking group 124A.

Synchronization node 142N is similar to synchronization node 142A and includes transceiver 402 and synchronization logic 404. Transceiver 402 acts similarly to transceiver 302 and is configured to transmit the data received from the control plane 108 to transceiver 306 of sentinel device 126A, as well as all of the other networking devices in networking group 124A in response to synchronization node 142A receiving an alarm from sentinel node 126A. Synchronization logic 404 then acts in a similar manner as synchronization logic 304 to assist in the transmission of data to sentinel node 126A and grouping the networking devices and sentinel devices. In this way, networking devices, such as networking devices 224A-N, will receive data from synchronization nodes in a distribution plane that are capable of providing the data such that the network latency is improved.

Figure 5A:
FIG. 5a-c show respective examples of protocols that may be used to transmit alarms from a sentinel device of a networking group of a data plane to a synchronization node of a distribution plane in a distributed computing environment, in accordance with various embodiments.
Figure 5B:
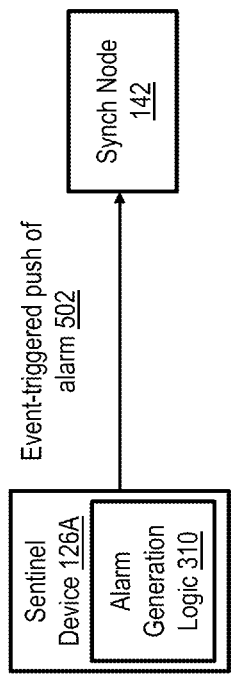
Figure 5C:
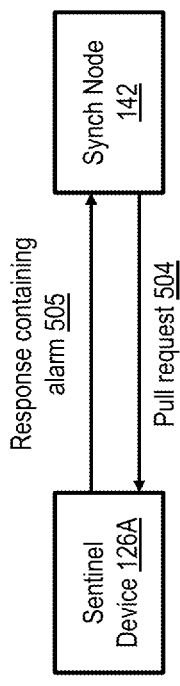

FIG. 5a-c show respective examples of protocols that may be used to transmit alarms from a sentinel device (e.g., sentinel device 126A) of a networking group (e.g., networking group 124A) of a data plane (e.g., data plane 232) to a synchronization node (e.g., synchronization node 142A) of a distribution plane (e.g., distribution plane 240) in a distributed computing environment, in accordance with various embodiments. In the embodiment shown in FIG. 5a, an alarm generated by sentinel device 126A may be sent from the sentinel device to synchronization node 142A (or to any of synchronization nodes 142) via scheduled "push" operations 501. For example, sentinel device 126A may be configured with a schedule according to which sentinel node 126A is to send any alarm that has been generated by alarm generation logic 310 to a given synchronization node (e.g., once every ten seconds or once every five seconds). The actual times at which the alarm is sent, in some implementations, to different targets from the sentinel device 126A (e.g., to synchronization nodes 142A-N), may be staggered to avoid network congestion caused by the alarm transfer itself. For example, if the alarm is to be pushed once every ten seconds to six synchronization nodes from the sentinel device 126A, the alarm transmission to each of the synchronization nodes may be scheduled one second apart.

In the embodiment shown in FIG. 5b, triggering events may lead to an alarm being transmitted. For example, alarm generation logic 310, which in some embodiments resides within sentinel device 126A, may determine that an alarm is required to be sent to any of synchronization nodes 142. For example, alarm generation logic 310 may determine, based on distribution delay in receiving command instructions or other data from the control plane 108, that an alarm is to be generated. More specifically, alarm generation logic 310 may detect that the distribution delay in receiving command instructions or other data from the control plane 108 has exceeded a threshold value. Once the alarm generation logic 310 makes this determination, it may automatically generate an alarm and immediately push 502 the alarm to any of synchronization nodes 142. In some embodiments, the triggered push 502 of the alarm may be initiated at a high priority as soon as the alarm is generated in some embodiments, in an attempt to respond as quickly as possible to the event.

In the embodiment depicted in FIG. 5c, the any of the synchronization nodes 142 (e.g., synchronization node 142A) may submit a pull request 504 to the sentinel node 126A for the most recent alarm. The latest alarm may accordingly then be sent to the synchronization node 142 submitting the pull request in the response 505. In various embodiments, combinations of any of the three approaches illustrated in FIG. 5a-5c may be used.

FIG. 6 shows an example responsiveness metric that may be utilized to generate an alarm utilizing a sentinel device (e.g., sentinel device 126A) in a distributed computing environment, in accordance with various embodiments. An example timeline is shown in FIG. 6, in which the time value increases from the left to right. At time T1, as indicated by block 602, pattern logic, such as pattern logic 308 which may reside in sentinel device 126A of networking group 124A, receives a command instruction from a control plane, such as control plane 208, requesting a state change for any networking device (e.g., an edge device) residing in networking group 124A. The command instruction, in an example, is transferred from the control plane to the sentinel device via a synchronization node, such as synchronization node 142A, residing in a distribution plane, such as distribution plane 240. As discussed previously, in alternative embodiments, pattern logic 308 may also receive client input data in addition to or instead of the command instruction, also from the control plane utilizing a synchronization node to enable the transfer.

As indicated by block 604, the pattern logic 308 may identify distribution latency patterns at time T2 in the depicted timeline. For example, the pattern logic 308 may utilize historical distribution latency (i.e., the time delay from transfer of the data from the control plane to the networking group) to identify patterns. These patterns may then be utilized to develop a threshold value of distribution delay acceptable to the system. For example, the pattern logic 308 may also generate a threshold value at which the distribution delay is unacceptable to the network. As discussed preciously, the threshold value may be based on QOS metrics. For example, this threshold value may be based on the distribution latency patterns identified. In some embodiments, the threshold value is based on the median and/or average distribution delay in the distribution latency patterns, while in alternative embodiments; the threshold value is based on a percentage of the longest distribution delay in the distribution latency patterns.

Alarm generation logic 310 may generate an alarm if the distribution delay in receiving the command instruction or other data from the control plane exceeds the threshold value, which is shown at time T3 in the example timeline of FIG. 6, as indicated by block 606. For example, the alarm logic may generate an alarm if the time measured from the transmission of a command instruction or other data from the control plane to the sentinel device equals or exceeds the threshold value generated by the pattern logic. However, alarm generation logic 310 may be configured such that no alarm is generated if the time measured from the transmission of the command instruction or other data from the control plane to the sentinel device is lower than the threshold value generated by the pattern logic.

Figure 7:
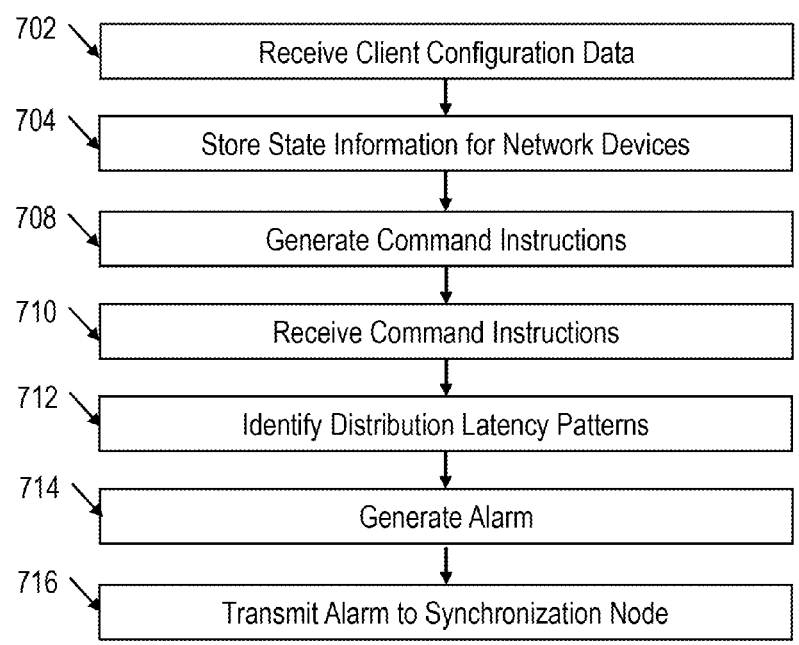
FIG. 7 shows a flow diagram illustrating aspects of operations that may be performed to generate an alarm based on distribution latency patterns in a distributed computing environment, in accordance with various embodiments.

FIG. 7 shows a flow diagram illustrating aspects of operations that may be performed to generate an alarm based on distribution latency patterns in a distributed computing environment, in accordance with various embodiments. As shown in element 702, client configuration data is received. The client configuration data may include a network configuration that a client requests be implemented. For example, the network configuration data may include subroutes, subnets, DNS mappings, elastic IP addresses, private IP addresses, etc. that the client requests be implemented in a distributed computer network. The client configuration data may be received by a control plane of the distributed computer network. In element 704, state information that corresponds to the client configuration data is stored. The state information may include a specific state for a networking device, such as an edge device, in a data plane of the distributed computer network, that when implemented by the networking device, implements the network configuration associated with the client request. The state information may be stored in a data store of the control plane.

In element 708, a command instruction is generated. The command instruction may be generated by the control plane and may instruct the networking device to change state to a state corresponding to the state information that is stored in the data store. Thus, if implemented, the command instruction would cause a networking device to implement the network configuration associated with the client request. In element 710, the command instruction is received by a sentinel device of the data plane that is associated with the networking device to receive the command instruction. For example, the sentinel device and a plurality of networking devices (e.g., edge devices) may comprise a networking group. The command instruction may be transmitted from the control plane to a synchronization node and from the synchronization node to each device of the networking group, including the networking devices required to implement the network configuration request and the sentinel device.

In element 712, distribution latency patterns are identified. After the sentinel device receives the client configuration data, the sentinel device may identify patterns in the distribution delay based on variety of QOS metrics including distribution latency or delay and accuracy of the received data. For distribution latency, the sentinel device may utilize historical distribution latency information that is stored in the sentinel device from previously received command instructions or data to identify patterns that correspond to the distribution delay.

In element 714, an alarm is generated. The sentinel device may utilize the distribution latency patterns to develop a threshold value of distribution delay acceptable to the network based, in some examples, on an SLA, a median distribution delay of historically received data from the control plane to the sentinel device, and/or a longest distribution delay of the historically received data from the control plane to the sentinel device. The sentinel device, then may compare the distribution delay in the command instruction received to the threshold value generated. If the distribution delay in the command instruction received by the sentinel device from the control plane is equal to or exceeds the threshold value, then the alarm is generated. In element 716, the alarm is transmitted from the sentinel device to the synchronization node that originally transmitted the command instruction to the sentinel device.

Figure 8:
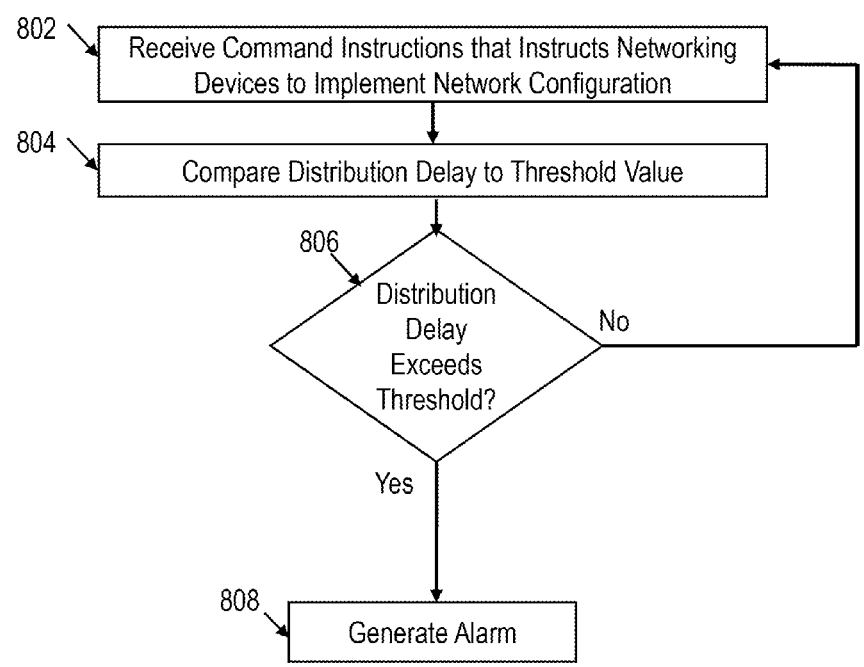
FIG. 8 shows a flow diagram illustrating aspects of operations that may be performed to generate an alarm based on a distribution delay exceeding a threshold value in a distributed computing environment, in accordance with various embodiments.

FIG. 8 shows a flow diagram illustrating aspects of operations that may be performed to generate an alarm based on a distribution delay exceeding a threshold value in a distributed computing environment, in accordance with various embodiments. In element 802, command instructions that instruct networking devices, such as edge devices, to implement a network configuration option requested by a client are received by a sentinel device. In alternative embodiments, state data that implements the network configuration may be received by the sentinel device. The sentinel device is part of a networking group that includes the networking devices that are to implement the network configuration option. The data may be received from a synchronization node in a distribution plane of a provider network. In element 804, a distribution delay in receiving the data from the synchronization node is compared to a threshold value by the sentinel device. The threshold value may be based on distribution latency patterns for historically received data and/or SLAs.

In element 806, a determination is made by the sentinel device as to whether the distribution delay for the data received equals or exceeds the threshold value. If, in element 806, a determination is made that the distribution delay for the data received does not equal or exceed the threshold value, then the method continues in element 802 with receiving additional command instructions or other data that instructs the networking devices to implement a network configuration option. However, if, in element 806, a determination is made by the sentinel device that the distribution delay for the data received does equal or exceed the threshold value, then the method continues in element 808 with generating, by the sentinel device, an alarm which, in some embodiments, may be transmitted back to the synchronization node that transmitted the original data to the sentinel device.

Figure 9:
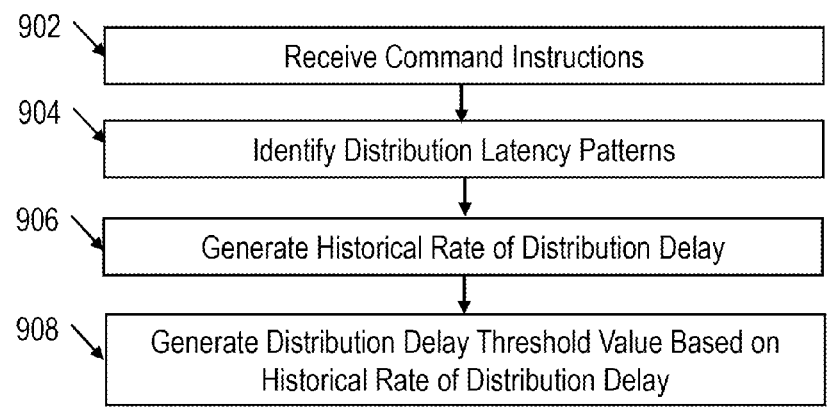
FIG. 9 shows a flow diagram illustrating aspects of operations that may be performed to generate a distribution delay threshold value in a distributed computing environment, in accordance with various embodiments.

FIG. 9 shows a flow diagram illustrating aspects of operations that may be performed to generate a distribution delay threshold value in a distributed computing environment, in accordance with various embodiments. In element 902, command instructions that instruct networking devices, such as edge devices, to implement a network configuration option requested by a client are received by a sentinel device. In alternative embodiments, state data that implements the network configuration may be received by the sentinel device. The sentinel device is part of a networking group that includes the networking devices that are to implement the network configuration option. In element 904, distribution latency patterns are identified. After the sentinel device receives the client configuration data, the sentinel device may identify patterns in the distribution delay based on variety of QOS metrics including distribution latency or delay and accuracy of the received data. In element 906, the sentinel device may generate a historic rate of distribution delay. For distribution latency, the sentinel device may utilize historical distribution latency information that is stored in the sentinel device from previously received command instructions or data to historical rate of distribution delay. For example, the sentinel device may utilize previously stored distribution delay to determine a historical median rate of distribution delay.

In element 908, the sentinel device generates a distribution delay threshold value based on the historical rate of distribution delay. For example, if the historical rate of distribution delay equates to a median delay of 10 ms, the threshold value may be double the historical rate of distribution delay. In this example, the threshold value would be set, by the sentinel device, to 20 ms. Alternatively, the historical rate of distribution delay may equate to the longest distribution delay stored by the sentinel device. For example, if the longest distribution delay, and thus, the historical rate of distribution delay is 20 ms, then the threshold value may be based on the 20 ms (e.g., 90% of 20 ms). In this example, the threshold value would be set, by the sentinel device to 18 ms.

Figure 10:
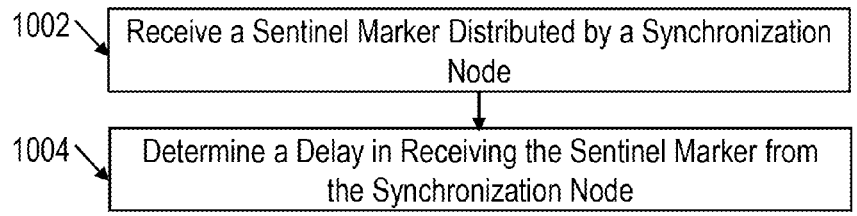
FIG. 10 shows a flow diagram illustrating aspects of operations that may be performed to determine a distribution delay in a distributed computing environment, in accordance with various embodiments.

FIG. 10 shows a flow diagram illustrating aspects of operations that may be performed to determine a distribution delay in a distributed computing environment, in accordance with various embodiments. In element 1002, a sentinel device may receive a sentinel marker distributed by a synchronization node in a distribution plane of the distributed computing environment. For example, a command instruction and or other data that is distributed from the synchronization node to the sentinel device may include embedded metadata. In element 1004, the sentinel device determines a delay in receiving the sentinel marker from the synchronization node (i.e., the distribution delay in the data received from the synchronization node). The metadata may include timing information that allows the sentinel device to calculate the elapsed time in receiving the data from the synchronization node. This elapsed time may equate to the distribution delay.

Figure 11:
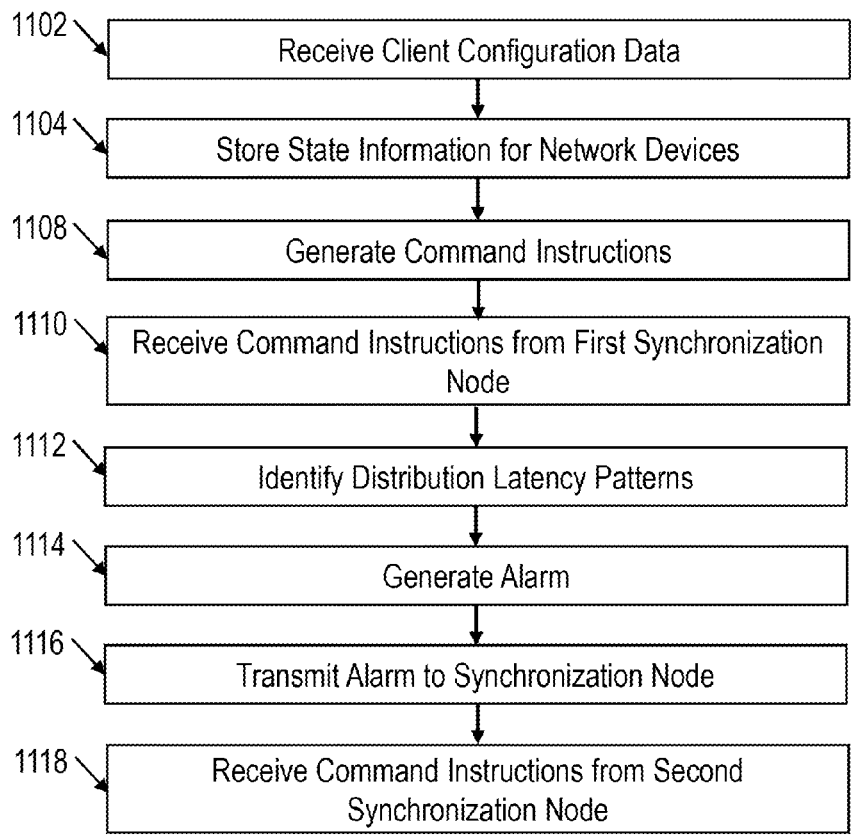
FIG. 11 shows a flow diagram illustrating aspects of operations that may be performed to distribute network configuration requests to networking devices in a distributed computing environment, in accordance with various embodiments.

FIG. 11 shows a flow diagram illustrating aspects of operations that may be performed to distribute network configuration requests to networking devices in a distributed computing environment, in accordance with various embodiments. As shown in element 1102, client configuration data is received. The client configuration data may include a network configuration that a client requests be implemented. For example, the network configuration data may include subroutes, subnets, DNS mappings, elastic IP addresses, private IP addresses, etc. that the client requests be implemented in a distributed computer network. The client configuration data may be received by a control plane of the distributed computer network. In element 1104, state information that corresponds to the client configuration data is stored. The state information may include a specific state for a networking device, such as an edge device, in a data plane of the distributed computer network, that when implemented by the networking device, implements the network configuration associated with the client request. The state information may be stored in a data store of the control plane.

In element 1108, a command instruction is generated. The command instruction may be generated by the control plane and may instruct the networking device to change state to a state corresponding to the state information that is stored in the data store. Thus, if implemented, the command instruction would cause a networking device to implement the network configuration associated with the client request. In element 1110, the command instruction is received by a sentinel device of the data plane that is associated with the networking device to receive the command instruction. For example, the sentinel device and a plurality of networking devices (e.g., edge devices) may comprise a networking group. The command instruction may be transmitted from the control plane to a first synchronization node and from the first synchronization node to each device of the networking group, including the networking devices required to implement the network configuration request and the sentinel device.

In element 1112, distribution latency patterns are identified. After the sentinel device receives the client configuration data, the sentinel device may identify patterns in the distribution delay based on variety of QOS metrics including distribution latency or delay and accuracy of the received data. For distribution latency, the sentinel device may utilize historical distribution latency information that is stored in the sentinel device from previously received command instructions or data to identify patterns that correspond to the distribution delay.

In element 1114, an alarm is generated. The sentinel device may utilize the distribution latency patterns to develop a threshold value of distribution delay acceptable to the network based, in some examples, on an SLA, a median distribution delay of historically received data from the control plane to the sentinel device, and/or a longest distribution delay of the historically received data from the control plane to the sentinel device. The sentinel device, then may compare the distribution delay in the command instruction received to the threshold value generated. If the distribution delay in the command instruction received by the sentinel device from the control plane is equal to or exceeds the threshold value, then the alarm is generated. In element 1116, the alarm is transmitted from the sentinel device to the first synchronization node that originally transmitted the command instruction to the sentinel device.

In element 1116, the sentinel device receives command instructions from a second synchronization node. After the first synchronization node receives the alarm, the first synchronization node may cease transmitting data to the networking group that contains the sentinel device. Thus, the sentinel device does not receive further data from the first synchronization node. However, a second synchronization node may transmit further data, including command instructions, to the networking group that contains the sentinel device, and thus, to the sentinel device itself.

Figure 12:
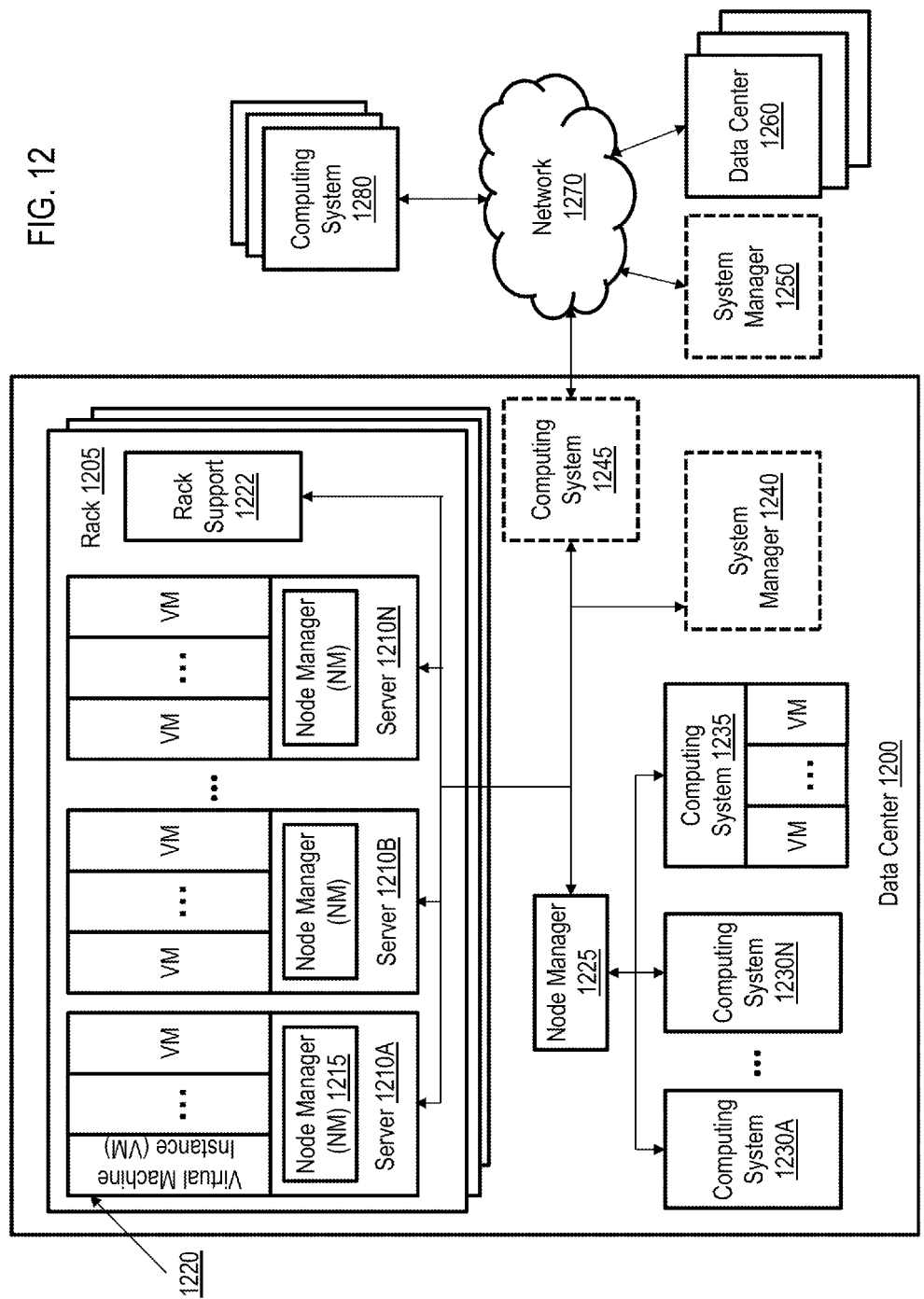
FIG. 12 shows a block diagram of a distributed computing environment, in accordance with various embodiments.

In at least some embodiments, a portion or all of one or more of the technologies described herein, including the techniques to implement the control plane, distribution plane, data plane, and/or networking devices (e.g., edge devices), may be implemented in a distributed computing environment, such as shown in FIG. 12. In particular, in this example a program execution service manages the execution of programs on various computing systems located within a data center 1200. Data center 1200 includes a number of racks 1205, and each rack includes a number of computing systems 1210A-N, as well as a rack support computing system 1222 in this example embodiment. The computing systems 1210 each host one or more virtual machine instances 1220 in this example, as well as a distinct node manager 1215 to manage the virtual machines. In this example, each virtual machine 1220 may be employed to provide an independent computing environment for executing an instance of program. In this example, the rack support computing system 1222 may provide various utility services for other computing systems local to the rack, as well as possibly to other computing systems located in the data center 1200. The utility services may include, for example, data and/or program storage for other computing systems, execution of one or more machine manager modules to support other computing systems, etc. Each computing system 1210 may alternatively have a distinct machine manager module (e.g., provided as part of the node manager for the computing system) and/or have local storage (not shown) to store local copies of programs. The computing systems 1210 and the rack support computing system 1222 all share a common data exchange medium in this example, and may all be part of a single group. This common data exchange medium may be connected to one or more external data exchange mediums shared by, for example, other racks or computing systems in the data center 1200.

In addition, the example data center 1200 further includes additional computing systems 1230A-N and 1235 that share a common data exchange medium with a node manager 1225, and node manager 1225 manages computing systems 1230 and 1235. In the illustrated example, computing system 1235 also hosts a number of virtual machines as execution environments for use in executing program instances for one or more users, while computing systems 1230 do not host distinct virtual machines. In this example, an optional computing system 1245 resides at the interconnect between the data center 1200 and an external network 1270. The optional computing system 1245 may provide a number of services such as acting as a network proxy, managing incoming and/or outgoing data transmissions, etc. Additionally, an optional system manager computing system 1240 is also illustrated. The optional system manager computing system 1240 may assist in managing the execution of programs on other computing systems located within the data center 1200 (or optionally on computing systems located in one or more other data centers 1260). The optional system manager computing system 1240 may execute a system manager module. A system manager module may provide a variety of services in addition to managing execution of programs, including the management of user accounts (e.g., creation, deletion, billing, etc.); the registration, storage, and distribution of programs to be executed; the collection and processing of performance and auditing data related to the execution of programs, the obtaining of payment from customers or other users for the execution of programs; etc.

In this example, the data center 1200 is connected to a number of other systems via a network 1270 (e.g., the Internet), including additional computing systems 1280 that may be operated by the operator of the data center 1200 or third parties such as clients, additional data centers 1260 that also may be operated by the operator of the data center 1200 or third parties, and an optional system manager 1250. In a manner similar to system manager 1240, the system manager 1250 may manage the execution of programs on computing systems located in one or more data centers 1200 and/or 1260, in addition to providing a variety of other services. Although the example system manager 1250 is depicted as external to any particular data center, in other embodiments it may be located within a data center, such as one of the data centers 1260.

Figure 13:
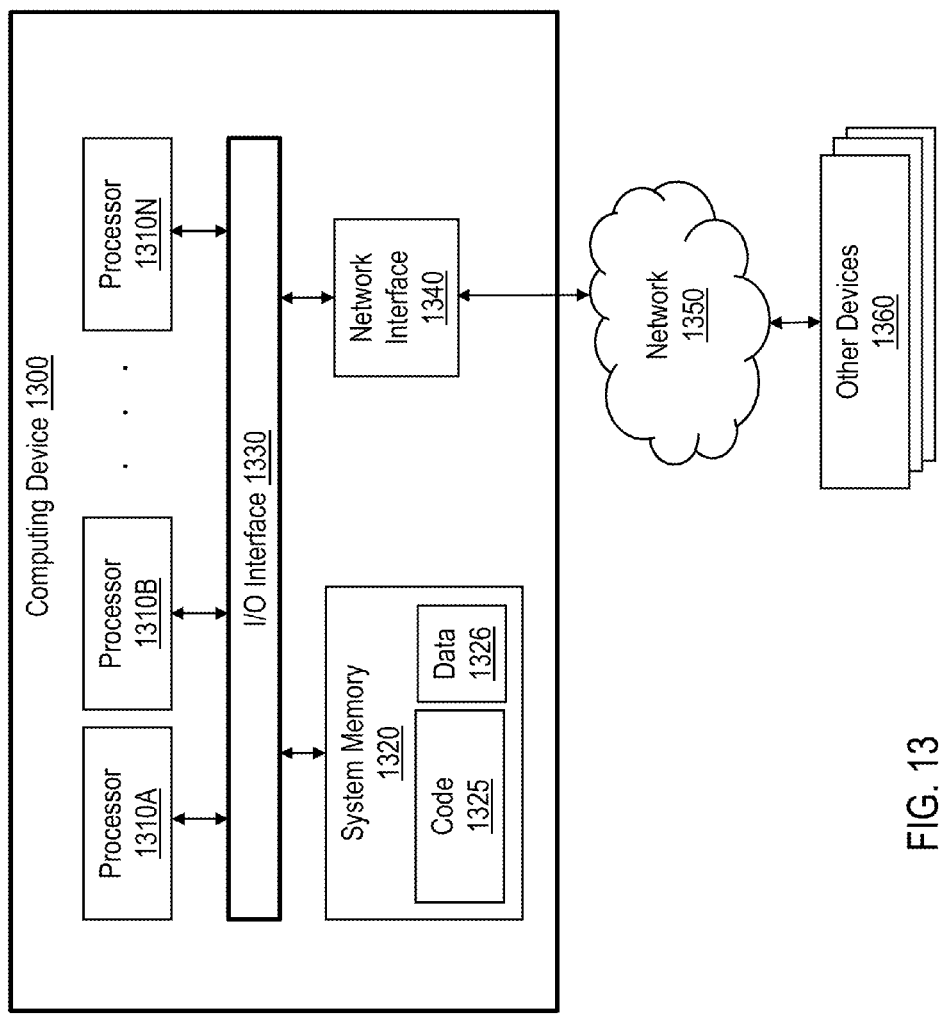
FIG. 13 shows a block diagram illustrating an example computing device, in accordance with various embodiments.

In at least some embodiments, a server that implements a portion or all of one or more of the technologies described herein, including the techniques to implement the control plane, distribution plane, data plane, and/or networking devices (e.g., edge devices), may include a general-purpose computer system that includes or is configured to access one or more computer-accessible media. FIG. 13 shows such a general-purpose computing device 1300. In the illustrated embodiment, computing device 1300 includes one or more processors 1310 coupled to a system memory 1320 via an input/output (I/O) interface 1330. Computing device 1300 further includes a network interface 1340 coupled to I/O interface 1330.

In various embodiments, computing device 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA. In some implementations, graphics processing units (GPUs) may be used instead of, or in addition to, conventional processors. In some embodiments, manager 110, synchronization logic 304, pattern logic 308, and/or alarm generation logic 310 are implemented by processors 1310.

System memory 1320 may be configured to store instructions and data accessible by processor(s) 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1320 as code 1325 and data 1326

In one embodiment, I/O interface 1330 may be configured to coordinate I/O traffic between processor 1310, system memory 1320, and any peripheral devices in the device, including network interface 1340 or other peripheral interfaces such as various types of persistent and/or volatile storage devices used to store physical replicas of data object partitions. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computing device 1300 and other devices 1360 attached to a network or networks 1350, such as other computer systems or devices as illustrated in FIG. 1 through FIG. 12, for example. In various embodiments, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks such as Fibre Channel SANs, or via any other suitable type of network and/or protocol.

In some embodiments, system memory 1320 may be one embodiment of a computer-accessible medium configured to store program instructions and data as described above for FIG. 1 through FIG. 12 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1300 via I/O interface 1330. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface 1340. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Certain terms are used throughout the preceding description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A non-transitory computer-readable medium storing instructions that when executed on a computing system cause the computing system to:
   receive, by a sentinel device of a data interface of a distributed computing environment, a plurality of command instructions that instruct a plurality of edge devices to change state to implement a plurality of network configuration requests from a synchronization node of a distribution interface of the distributed computing environment utilizing a communication protocol, the data interface including a networking group that comprises the sentinel device and the plurality of edge devices;
   identify, by the sentinel device, distribution latency patterns of the command instructions based on distribution delay of the command instructions from the synchronization node to the sentinel device; and
   generate, by the sentinel device, an alarm based on a determination that the distribution delay of one of the command instructions exceeds a threshold value that is based on an historical rate of distribution delay.

2. The computer-readable medium of claim 1, wherein the instructions, when executed, further cause the computing system to:
   transmit, by the sentinel device, the alarm to the synchronization node; and
   in response to the generation of the alarm, receive, by the sentinel device, a second plurality of command instructions form a second synchronization node.

3. The computer-readable medium of claim 1, wherein the communication protocol causes the sentinel device to appear the same to the synchronization node as each of the plurality of edge devices appears to the synchronization node.

4. A system comprising:
   a first plurality of networking devices of a data interface of a distributed computing environment, each of the networking devices configured to route data packets in the distributed computing environment;
   a first sentinel device of the data interface that is associated with the first plurality of networking devices; and
   a first synchronization node of a distribution plane of the distributed computing environment, the first synchronization node configured to receive a plurality of command instructions corresponding to a plurality of network configuration requests received from a control interface of the distributed computing environment and distribute the command instructions to the first plurality of networking devices and first sentinel device via a communication protocol,
   wherein the first sentinel device is configured to identify distribution latency patterns of the command instructions and generate an alarm based on the identified distribution latency patterns.

5. The system of claim 4, wherein the generation of the alarm is based on a determination that a distribution delay of one of the command instructions exceeds a threshold value.

6. The system of claim 5, wherein the threshold value is based on an historical rate of distribution delay.

7. The system of claim 4, wherein the communication protocol causes the first sentinel device to appear the same to the first synchronization node as each of the first plurality of networking devices appears to the first synchronization node.

8. The system of claim 4, wherein the sentinel device is further configured to store a historical network configuration for the plurality of networking devices and to transmit the historical network configuration to a client.

9. The system of claim 8, wherein, in response to receiving the alarm from the first sentinel device, the first synchronization node ceases distribution of command instructions to the first sentinel device and the first plurality of networking devices.

10. The system of claim 9, wherein, in response to the generation of the alarm, a second synchronization node begins distribution of command instructions to the first sentinel device and the first plurality of networking devices.

11. The system of claim 4, further comprising:
a second plurality of networking devices of the data interface;
a second sentinel device of the data interface that is associated with the second plurality of networking devices; and
a second synchronization node of the distribution plane, the second synchronization node configured to receive the plurality of command instructions and distribute the command instructions to the second plurality of networking devices and second sentinel device via the communication protocol.

12. The system of claim 11, wherein, in response to receiving the alarm from the first sentinel device, the first synchronization node ceases distribution of command instructions to the first sentinel device and the first plurality of networking devices and the second synchronization node begins distribution of the command instructions to the first sentinel device and the first plurality of networking devices.

13. The system of claim 11, wherein the first plurality of networking devices correspond to a first availability zone and the second plurality of networking devices correspond to a second availability zone.

14. The system of claim 4, wherein the first sentinel device is further configured to determine that the first plurality of networking devices have implemented the network configuration requests and transmit a signal to a client, the signal indicating that the network configuration requests have been implemented.

15. A method, comprising:
receiving, by a sentinel device of a data interface of a distributed computing environment and associated with a plurality of networking devices, a plurality of command instructions that instruct the plurality of networking devices to implement a plurality of network configuration requests from a first synchronization node of a distribution interface of the distributed computing environment utilizing a communication protocol;
identifying, by the sentinel device, distribution latency patterns of the command instructions;
generating, by the sentinel device, an alarm based on the distribution latency patterns; and
transmitting, by the sentinel device, the alarm to the first synchronization node.

16. The method of claim 15, wherein the communication protocol causes the sentinel device to appear the same to the first synchronization node as each of the plurality of networking devices appears to the first synchronization node.

17. The method of claim 15, wherein the generating the alarm includes determining a distribution delay of one of the command instructions exceeds a threshold value.

18. The method of claim 17, wherein the threshold value is based on an historical rate of distribution delay.

19. The method of claim 15, the identifying the distribution latency patterns includes:
receiving, by the sentinel device, a sentinel marker distributed by the first synchronization node in one of the plurality of command instructions, the sentinel marker comprising metadata identifying the first synchronization node; and
determining, by the sentinel device, a delay in receiving the sentinel marker from the first synchronization node.

20. The method of claim 15, further comprising, in response to transmitting the alarm to the first synchronization node, receiving, by the sentinel device, the plurality of command instructions from a second synchronization node.

21. The method of claim 15, wherein the sentinel device and the plurality of networking devices form an edge group in the data interface.

* * * * *